UNITED STATES PATENT OFFICE.

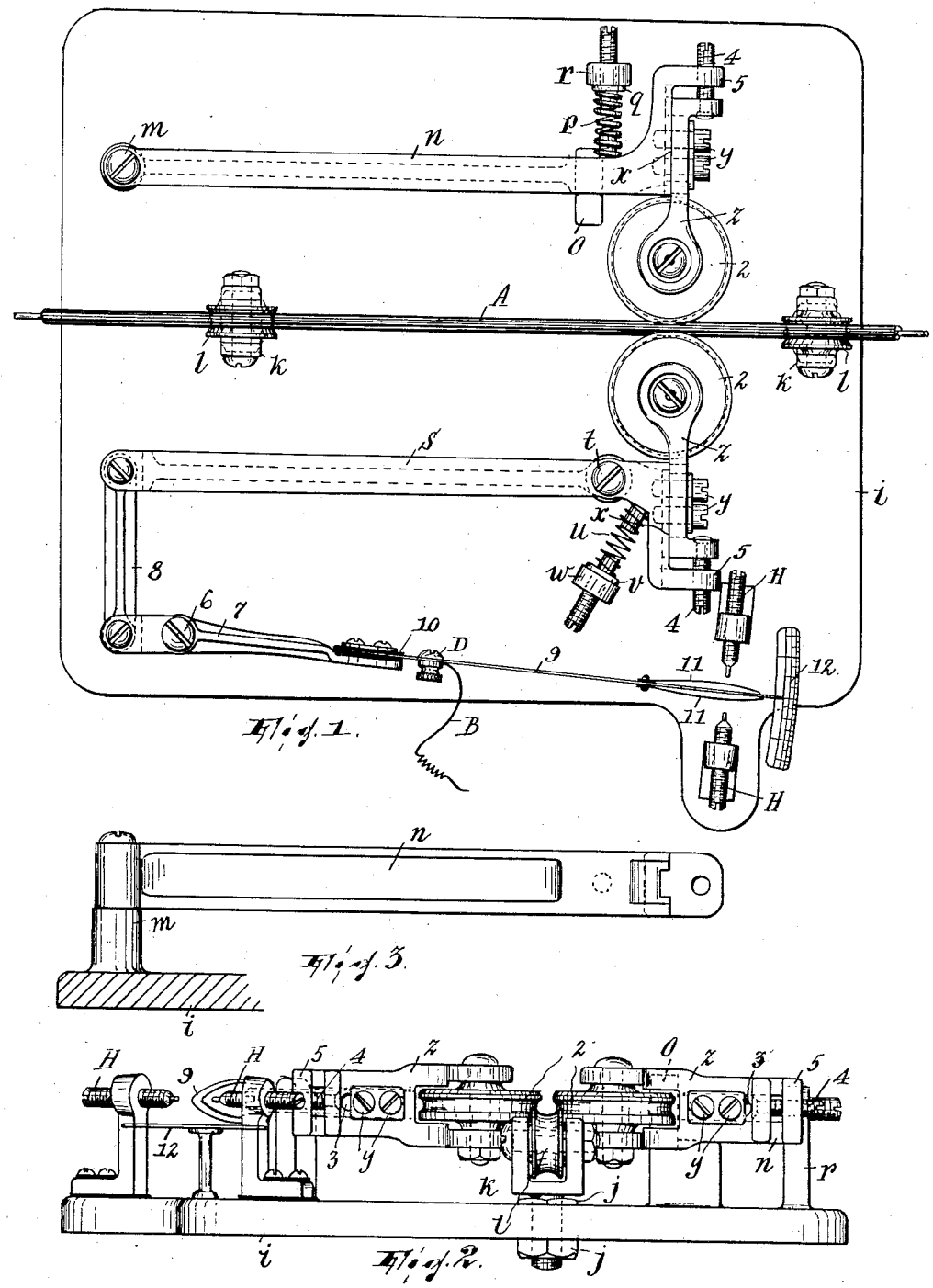

WILLIAM H. McGAULEY, OF BRIDGEPORT, CONNECTICUT.

APPARATUS FOR INDICATING VARIATIONS IN GAGE OF INSULATED WIRE.

1,133,300.

Specification of Letters Patent.

Patented Mar. 30, 1915.

Application filed March 5, 1913. Serial No. 751,982.

*To all whom it may concern:*

Be it known that I, WILLIAM H. McGAULEY, a citizen of the United States, residing at Bridgeport, in the county of Fairfield and State of Connecticut, have invented certain new and useful Improvements in Apparatus for Indicating Variations in Gage of Insulated Wire, of which the following is a specification.

According to the common method of forming an insulative coating of rubber or other similar plastic compound on wire, the wire is drawn through an orifice in the chambered head of what is known as a "tubing" machine and simultaneously the compound, contained in the chamber of said head, is forced out of its orifice, assuming the form of a cylindrical or tubular coating about the wire. It is well-known that this coating is likely to vary very appreciably in thickness, so that the product is not only irregular but a very material waste results through a surplus of compound being in places deposited on the wire, there being usually a surplus rather than an insufficiency of compound because the uses to which the covered wire is put necessitate the thickness of its "wall" being never below a certain standard. Uniformity of thickness of the coating may be accomplished of course by changing the speed of advance of the wire relatively to the feed of the compound through the forming orifice (or vice versa) at the inception of any change from a standard gage of product, but heretofore this has been made to depend on the skill and experience of the attendant which, with any appreciable rate of delivery of finished product, were not qualified to detect the variations and regulate the operations with any material result. The difficulty of detecting with the eye alone variations in thickness of the "wall" of the coating will be apparent when it is considered that the variations usually occur gradually, a change from the minimum to the maximum (or vice versa) of thickness usually extending through several feet in the length of the product.

My object is to provide means whereby to assist the attendant in detecting, practically at its inception, any change in thickness of the product.

In the accompanying drawings, Figure 1 is a plan view of the principal part of the present invention; Fig. 2 is a front elevation thereof; and, Fig. 3 is an inside elevation of a certain lever $n$.

$i$ is a base plate in which, by means of the nuts $j$, bearing against the top and bottom of said plate, are vertically adjustably secured the threaded stems of two brackets $k$ in which on horizontal axes are journaled peripherally grooved rollers $l$ for supporting the advancing covered wire. Any suitable support may be employed for the base plate $i$, which stands horizontally.

On a vertical stud $m$ at one side of the wire is fulcrumed at one end a lever $n$ which is normally pressed toward the wire A and against a stop $o$ by a spiral spring $p$ interposed between the lever and the head $q$ of an adjusting screw tapped into a stud $r$ on the plate. Parallel with the lever $n$ and on the opposite side of the wire is arranged another lever $s$ whose fulcrum point (on a stud $t$) is near the end thereof relatively opposite to the end at which the lever $n$ is fulcrumed; the lever $s$ has its shorter arm normally pressed toward the wire by a spiral spring $u$ (opposing less resistance to the movement of lever $s$ than spring $p$ opposes to the movement of lever $n$) interposed between its said shorter arm and the head $v$ of an adjusting screw tapped into a stud $w$ rising from plate $i$.

The free end of lever $n$ and the end of the shorter arm of lever $s$ are formed with alined surfaces $x$ arranged at right angles to the path of travel of the wire A, and against the surfaces there are held, by the screws $y$, the forked brackets $z$ projecting toward the wire and in each of which is journaled a peripherally grooved roller 2 adapted to receive the wire A in its groove. The brackets $z$ may be adjusted toward and from the wire on the levers $n$ and $s$, this being permitted by forming the openings in the brackets through which the screws $y$ pass as slots 3. A micrometer adjustment of each bracket, after releasing the screws $y$, may be effected by turning the screws 4 tapped into projections 5 of the levers and swiveled in the brackets.

On an upstanding stud 6 on plate $i$ is fulcrumed near one end a lever 7 whose shorter arm is pivotally connected with the free end of lever $s$ by the link 8 and whose longer arm terminates in an (preferably flexible) extension 9, in the present instance insulated from the body portion of lever 7 as at 10, and provided near its free end and on both sides with the bowed metallic contact pieces 11. The free end of the lever 7 operates as a pointer with respect to an arc-shaped gage 12 supported on the plate $i$. The wire is assumed to be drawn to the left in Fig. 1 by any suitable means and to receive its coating at a point to the right in said figure from a tubing machine, these being not shown. Upon the wire being introduced between the rollers 2, 2 it will be apparent that the lever system $s$, 8 and 7 will be shifted, the lever 7 swinging outwardly or away from the wire, the arrangement of the levers and the link being such that a material amplification of the movement effected at the roller 2 in the system will result at the free end of the extension 9 of lever 7. Any surface deviation in the advancing covered wire laterally with respect to its path of movement so slight that it might not be apparent to the unaided eye, would be clearly indicated by the considerably greater movement of the free end of the extension 9 of lever 7. By adjusting the roller carrying brackets $z$ transversely of the path of travel of the wire so that for any predetermined standard of gage of the covered wire being operated upon the mean position of the pointer relatively to the gage 12 would be at zero thereon, the attendant can determine instantly from the gage and pointer whether the fluctuation of the gage of the wire, one way or the other, is sufficient to necessitate a change in the relation of the speeds of the draft means and compound forwarding means. Occasionally the compound will be caused for one reason or another to be deposited on the wire in an abnormally thick mass. It is to insure such an abnormal enlargement in the covered wire being permitted to pass the rollers 2, 2 that the lever $n$, as well as the lever $s$, is yieldingly supported, the resistance opposed by the support for the wire including the parts 2, $z$, $n$ and $p$ is however so much greater than that opposed by the support including the parts 2, $z$, $s$ and $u$ that under normal conditions only the latter support yields.

I have shown in Fig. 1 a binding post D on the extension 9 of lever 7 and two adjustable contact screws H arranged on and insulated from the plate $i$ in opposition to each other and at opposite sides of the extension 9, the binding post D on the one hand and the screw H on the other serving as the terminals of a circuit B which may include electro-magnetic means (not shown) for operating a signal when either of the contact pieces 11 on the extension 9 contacts with a screw H.

Having thus fully described my invention, what I claim as new and desire to secure by Letters Patent is:—

In combination, a supporting structure, a lever fulcrumed therein on a vertical axis, a motion-amplifying means operatively connected with and actuated by said lever and including a pointer, a gage with reference to which the pointer is movable, another lever fulcrumed in said structure on a vertical axis, opposite wire-contact devices carried by the levers, and springs resisting movement of the contact-devices-carrying portions of said levers from each other, the spring for the second lever opposing greater resistance than the other spring, substantially as described.

In testimony whereof I affix my signature in presence of two witnesses.

WILLIAM H. McGAULEY.

Witnesses:
 JOHN W. LINWARD,
 WM. D. BELL.